United States Patent

(12) United States Patent
Liu et al.

(10) Patent No.: US 12,529,028 B2
(45) Date of Patent: Jan. 20, 2026

(54) KLEBSIELLA PNEUMONIAE AND USE THEREOF

(71) Applicant: Inner Mongolia University of Technology, Inner Mongolia (CN)

(72) Inventors: Zhanying Liu, Inner Mongolia (CN); Dong Wu, Inner Mongolia (CN); Jian Pang, Inner Mongolia (CN)

(73) Assignee: Inner Mongolia University of Technology, Inner Mongolia (CN)

( * ) Notice: Subject to any disclaimer, the term of this patent is extended or adjusted under 35 U.S.C. 154(b) by 568 days.

(21) Appl. No.: 17/907,864

(22) PCT Filed: Mar. 9, 2021

(86) PCT No.: PCT/CN2021/079665
§ 371 (c)(1),
(2) Date: Jan. 18, 2023

(87) PCT Pub. No.: WO2021/227622
PCT Pub. Date: Nov. 18, 2021

(65) Prior Publication Data
US 2023/0147791 A1    May 11, 2023

(30) Foreign Application Priority Data
May 13, 2020 (CN) .......................... 202010401844.2

(51) Int. Cl.
*C12N 1/20* (2006.01)
*C12N 9/42* (2006.01)
*C12P 7/06* (2006.01)
*C12P 7/18* (2006.01)
*C12P 7/54* (2006.01)
*C12P 7/56* (2006.01)
*C12R 1/22* (2006.01)

(52) U.S. Cl.
CPC ............. *C12N 1/205* (2021.05); *C12N 9/244* (2013.01); *C12N 9/2445* (2013.01); *C12P 7/06* (2013.01); *C12P 7/18* (2013.01); *C12P 7/54* (2013.01); *C12P 7/56* (2013.01); *C12R 2001/22* (2021.05)

(58) Field of Classification Search
CPC . C12N 1/205; C12N 9/244; C12P 7/06; C12P 7/18; C12P 7/54; C12P 7/56; C12R 2001/22
See application file for complete search history.

(56) References Cited

PUBLICATIONS

Raghunandan K, McHunu S, Kumar A, Kumar KS, Govender A, Permaul K, Singh S. Biodegradation of glycerol using bacterial isolates from soil under aerobic conditions. J Environ Sci Health A Tox Hazard Subst Environ Eng. 2014;49(1):85-92. doi: 10.1080/10934529.2013.824733. PMID: 24117087. (Year: 2014).*

* cited by examiner

*Primary Examiner* — Louise W Humphrey
*Assistant Examiner* — Rachel Emily Martin
(74) *Attorney, Agent, or Firm* — Harness, Dickey & Pierce, P.L.C.

(57) ABSTRACT

The present disclosure provides a *Klebsiella pneumoniae* Y7-3 with a deposit number of CCTCC NO: M2019851. The strain can degrade corn stover into acetic acid, ethanol, and hydrogen, and can further metabolize into acetic acid, ethanol, 1,3-propanediol, lactic acid, and hydrogen.

11 Claims, 3 Drawing Sheets
Specification includes a Sequence Listing.

SEQUENCE LISTING

<160> NUMBER OF SEQ ID NOS: 3

<210> SEQ ID NO 1
<211> LENGTH: 1438
<212> TYPE: DNA
<213> ORGANISM: Artificial Sequence
<220> FEATURE:
<223> OTHER INFORMATION: PCR amplification product of Klebsiella
pneumoniae

<400> SEQUENCE: 1

```
ctggcgcagg ctacacatgc aagtcgagcg gtagcacaga gagcttgctc tcgggtgacg    60
agcggcggac gggtgagtaa tgtctgggaa actgcctgat ggagggggat aactactgga   120
aacggtagct aataccgcat aacgtcgcaa gaccaaagtg ggggaccttc gggcctcatg   180
ccatcagatg tgcccagatg ggattagcta gtaggtgggg taacggctca cctaggcgac   240
gatccctagc tggtctgaga ggatgaccag ccacactgga actgagacac ggtccagact   300
cctacgggag gcagcagtgg ggaatattgc acaatgggcg caagcctgat gcagccatgc   360
cgcgtgtgtg aagaaggcct tcgggttgta aagcactttc agcggggagg aaggcgataa   420
ggttaataac cttgtcgatt gacgttaccc gcagaagaag caccggctaa ctccgtgcca   480
gcagccgcgg taatacggag ggtgcaagcg ttaatcggaa ttactgggcg taaagcgcac   540
gcaggcggtc tgtcaagtcg gatgtgaaat ccccgggctc aacctgggaa ctgcattcga   600
aactggcagg ctagagtctt gtagaggggg gtagaattcc aggtgtagcg gtgaaatgcg   660
tagagatctg gaggaatacc ggtggcgaag gcggcccct ggacaaagac tgacgctcag   720
gtgcgaaagc gtggggagca aacaggatta gataccctgg tagtccacgc cgtaaacgat   780
gtcgatttgg aggttgtgcc cttgaggcgt ggcttccgga gctaacgcgt taaatcgacc   840
gcctggggag tacggccgca aggttaaaac tcaaatgaat tgacggggc cgcacaagc    900
ggtggagcat gtggtttaat tcgatgcaac gcgaagaacc ttacctggtc ttgacatcca   960
cagaacttac cagagatggc ttggtgcctt cgggaactgt gagacaggtg ctgcatggct  1020
gtcgtcagct cgtgttgtga atgttgggt taagtcccgc aacgagcgca acccttatcc  1080
tttgttgcca gcggttaggc cgggaactca aaggagactg ccagtgataa actggaggaa  1140
ggtggggatg acgtcaagtc atcatggccc ttacgaccag gctacacac gtgctacaat  1200
ggcatataca aagagaagcg acctcgcgag agcaagcgga cctcataaag tatgtcgtag  1260
tccggattgg agtctgcaac tcgactccat gaagtcggaa tcgctagtaa tcgtagatca  1320
gaatgctacg gtgaatacgt tcccgggcct tgtacacacc gcccgtcaca ccatgggagt  1380
gggttgcaaa agaagtaggt agcttaacct tcgggagggc gcttaccact tgatcgcg    1438
```

<210> SEQ ID NO 2
<211> LENGTH: 20
<212> TYPE: DNA
<213> ORGANISM: Artificial Sequence
<220> FEATURE:
<223> OTHER INFORMATION: primer 27F

<400> SEQUENCE: 2

```
agagtttgat cctggctcag                                                 20
```

<210> SEQ ID NO 3
<211> LENGTH: 19
<212> TYPE: DNA
<213> ORGANISM: Artificial Sequence
<220> FEATURE:

```
<223> OTHER INFORMATION: primer 1492R

<400> SEQUENCE: 3
ggttaccttg ttacgactt                                                    19
```

KLEBSIELLA PNEUMONIAE AND USE THEREOF

CROSS REFERENCE TO RELATED APPLICATION

This patent application is a 371 U.S. National Phase of International Application No. PCT/CN2021/079665, filed Mar. 9, 2021, which claims the benefit and priority of Chinese Patent Application No. 202010401844.2, filed on May 13, 2020, the disclosures of which are incorporated by reference herein in their entirety as part of the present.

SEQUENCE LISTING

This application contains references to amino acid sequences and/or nucleic acid sequences which have been submitted concurrently herewith as the sequence listing text file entitled "18006-000048usnp_Sequence_listing.TXT", file size 2.65 KiloBytes (KB), created on Sep. 28, 2022. The aforementioned sequence listing is hereby incorporated by reference in its entirety pursuant to 37 C.F.R. § 1.52(e)(5).

TECHNICAL FIELD

The present disclosure belongs to the technical field of biochemical engineering, and specifically relates to *Klebsiella pneumoniae* and use thereof.

BACKGROUND ART

Using fossil fuels could cause a series of environmental problems, it is urgent to develop clean biomass energy. Biomass-based productions of food, chemicals, energy and fuels are made great progress in recent years. It is very attractive to degrade lignocellulose from industrial and agricultural wastes and produce energy products (such as ethanol, methane, and hydrogen) and/or chemicals (such as acetic acid, butyric acid, and propionic acid), which may replace fossil fuels. The ethanol and hydrogen as the most ideal biofuels are well-defined production technologies and processes. However, raw material sources and production processes of the ethanol and hydrogen still need to be improved. The raw materials for producing ethanol mainly come from various starch such as corn, resulting in the phenomena of "competing with people for grain" and "competing with grain for land". The industrial production of hydrogen is 96% from fossil energy cracking to produce hydrogen, and 4% from water electrolysis to produce hydrogen, which limits long-term and sustainable development for hydrogen energy.

Cellulose is the most abundant renewable resource on the earth, it is mainly synthesized by plants through photosynthesis. About $2.5 \times 10^{12}$ t of the cellulose can be produced annually. However, it is made up of linear chains of 1,4-β-linked glucosyl residues, which lead to the difficulty for effective degradation. So, a large part of cellulose resources are wasted, and even turning into solid wastes causing environmental pollution. The use of waste cellulose materials to produce energy products can alleviate the tight energy demand, as well as solve the environmental and resource waste problems caused by solid wastes. Enzymatic hydrolysis cellulose is an environmentally friendly and effective way in numerous cellulose degradation technology. However, lacking high-efficiency enzymes or microbes that deconstruct cellulose is a major bottleneck. Lots of researchers have focused to screen high efficient cellulase-producing microorganisms from different niches (soil, compost piles, rumens and so on). So far, a variety of anaerobic and aerobic cellulolytic bacteria with cellulase secretion capacity were isolated from different environments. Rumen microorganisms have diverse kinds of enzymes activities with cellulase, xylanase, β-glucanase, and so on. Therefore, it is of great significance to obtain a novel strain with the capable of degrade cellulose and producing energy products such as ethanol and hydrogen from rumen. This work will contribute to develop clean biomass energy to replace fossil fuels.

SUMMARY

A purpose of the present disclosure is to produce energy products (ethanol and hydrogen) and chemicals (acetic acid, 1,3-propanediol, and lactic acid) by degrading lignocellulose from agricultural wastes such as corn stover.

The present disclosure provides a *Klebsiella pneumoniae* Y7-3, where the strain has been deposited in the China Center for Type Culture Collection (CCTCC) in Wuhan University, China on Oct. 24, 2019, with a deposit number of CCTCC NO: M2019851.The *Klebsiella pneumoniae* Y7-3 with a deposit number of CCTCC NO: M2019851 is abbreviated as *Klebsiella pneumoniae* Y7-3.

The present disclosure further provides a microbial inoculant, including the *Klebsiella pneumoniae* Y7-3 with a deposit number of CCTCC NO: M2019851.The present disclosure further provides use of the microbial inoculant, including at least one of a1) to a12): a1) degradation of cellulose; a2) degradation of hemicellulose; a3) degradation of a carbon source; a4) degradation of a nitrogen source; a5) production of at least one of acetic acid, ethanol, 1,3-propanediol, lactic acid, and hydrogen; a6) preparation of exoglucanase, endoglucanase, and/or β-glucosidase from extracellular fermentation broth; a7) preparation of a product for cellulose degradation; a8) preparation of a product for hemicellulose degradation; a9) preparation of a product for carbon source degradation; a10) preparation of a product for nitrogen source degradation; a11) preparation of a product for production of at least one of the acetic acid, the ethanol, the 1,3-propanediol, the lactic acid, and the hydrogen; and a12) preparation of a product with a function of the exoglucanase, the endoglucanase, and/or the β-glucosidase.

The present disclosure further provides a preparation method of the microbial inoculant, including the following steps: inoculating the *Klebsiella pneumoniae* Y7-3 with a deposit number of CCTCC NO: M2019851 into a bacterial medium, and culturing to obtain a bacterial seed liquid, namely the microbial inoculant.

The bacterial medium may be an LB liquid medium.

In addition to an active ingredient, the microbial inoculant may further include a carrier. The carrier may be a solid carrier or a liquid carrier. The solid carrier may be a mineral material, a plant material or a polymer compound. The mineral material may be at least one of clay, talc, kaolin, montmorillonite, white carbon, zeolite, silica, and diatomaceous earth. The plant material may be at least one of bran, soybean meal, corn meal, soybean meal, and starch. The polymer compound may be polyvinyl alcohol and/or polyglycol. The liquid carrier may be an organic solvent, vegetable oil, mineral oil or water. The organic solvent may be decane and/or dodecane. In the microbial inoculant, the active ingredient can exist in the form of cultured living cells, a fermentation broth of the living cells, a filtrate of a cell culture, or a mixture of cells and the filtrate. The composition may be in various dosage forms, including liquids, emulsions, suspensions, powders, granules, wettable powders, or water-dispersible granules.

According to needs, a surfactant (such as Tween 20, Tween 80), an adhesive, a stabilizer (such as antioxidants), and a pH adjuster may further be added to the microbial inoculant.

In the microbial inoculant, in the "preparation of exoglucanase, endoglucanase, and/or β-glucosidase" or the "preparation of a product with a function of the exoglucanase, the endoglucanase, and/or the β-glucosidase", the exoglucanase, the endoglucanase, and/or the β-glucosidase can be specifically obtained from a supernatant of the microbial inoculant by separation (namely extracellular enzyme).

The present disclosure further provides use of the *Klebsiella pneumoniae*, including at least one of a1) to a12): a1) degradation of cellulose; a2) degradation of hemicellulose; a3) degradation of a carbon source; a4) degradation of a nitrogen source; a5) production of at least one of acetic acid, ethanol, 1,3-propanediol, lactic acid, and hydrogen; a6) preparation of exoglucanase, endoglucanase, and/or β-glucosidase; a7) preparation of a product for cellulose degradation; a8) preparation of a product for hemicellulose degradation; a9) preparation of a product for carbon source degradation; a10) preparation of a product for nitrogen source degradation; a11) preparation of a product for production of at least one of the acetic acid, the ethanol, the 1,3-propanediol, the lactic acid, and the hydrogen; and a12) preparation of a product with a function of the exoglucanase, the endoglucanase, and/or the β-glucosidase from extracellular fermentation broth.

In the use, in the "preparation of exoglucanase, endoglucanase, and/or β-glucosidase" or the "preparation of a product with a function of the exoglucanase, the endoglucanase, and/or the β-glucosidase", the exoglucanase, the endoglucanase, and/or the β-glucosidase can be specifically obtained from a supernatant of fermentation broth of the *Klebsiella pneumoniae* by separation (namely extracellular enzyme).

In any one of the uses, the *Klebsiella pneumoniae* may be the *Klebsiella pneumoniae* Y7-3.

The present disclosure further provides a product, including *Klebsiella pneumoniae*; where the product has at least one of the functions a1) to a6): a1) degradation of cellulose; a2) degradation of hemicellulose; a3) degradation of a carbon source; a4) degradation of a nitrogen source; a5) production of at least one of acetic acid, ethanol, 1,3-propanediol, lactic acid, and hydrogen; a6) preparation of exoglucanase, endoglucanase, and/or β-glucosidase from extracellular fermentation broth.

In the product, in the "preparation of exoglucanase, endoglucanase, and/or β-glucosidase" or the "preparation of a product with a function of the exoglucanase, the endoglucanase, and/or the β-glucosidase", the exoglucanase, the endoglucanase, and/or the β-glucosidase can be specifically obtained from a supernatant of a fermentation broth of *Klebsiella pneumoniae* by separation (namely extracellular enzyme).

In any one of the products, the *Klebsiella pneumoniae* may be the *Klebsiella pneumoniae* Y7-3.

The present disclosure further provides a method for degrading cellulose and/or hemicellulose, including: treating a substance containing the cellulose and/or the hemicellulose with *Klebsiella pneumoniae*.

In the method, the "treating a substance containing the cellulose and/or the hemicellulose with *Klebsiella pneumoniae*" can be conducted by adding a substance containing the cellulose and/or the hemicellulose to a fermentation broth of the *Klebsiella pneumoniae*.

The substance containing the cellulose and/or the hemicellulose may be plant straw. The plant may be at least one of corn, wheat, barley, sorghum, *Caragana korshinskii*, and *Salix cheilophila*.

The present disclosure further provides a method for degrading a carbon source and/or a nitrogen source, including: treating the carbon source and/or the nitrogen source with *Klebsiella pneumoniae*.

In the method, the "treating the carbon source and/or the nitrogen source with *Klebsiella pneumoniae*" can be conducted by adding a carbon source and/or a nitrogen source to a fermentation broth of the *Klebsiella pneumoniae*.

The present disclosure further provides a method for producing at least one of acetic acid, ethanol, 1,3-propanediol, lactic acid, and hydrogen, including: degrading a carbon source and/or a nitrogen source with *Klebsiella pneumoniae*.

In the method, the " degrading a carbon source and/or a nitrogen source with *Klebsiella pneumoniae*" can be conducted by adding a carbon source and/or a nitrogen source to a fermentation broth of the *Klebsiella pneumoniae*; during the degradation, at least one of the acetic acid, the ethanol, the 1,3-propanediol, the lactic acid, and the hydrogen can be produced.

The present disclosure further provides a method for preparing exoglucanase, endoglucanase, and/or β-glucosidase, including the following steps:

(1) conducting fermentation culture on *Klebsiella pneumoniae* to obtain a fermentation broth;
(2) separating the exoglucanase, the endoglucanase, and/or the β-glucosidase from the fermentation broth.

In the method, the "separating the exoglucanase, the endoglucanase, and/or the β-glucosidase from the fermentation broth" may specifically be separating the exoglucanase, the endoglucanase, and/or the β-glucosidase from a supernatant of the fermentation broth (namely extracellular enzyme).

In any one of the methods, the *Klebsiella pneumoniae* may be the *Klebsiella pneumoniae* Y7-3.

A preparation method of the fermentation broth of any one of the *Klebsiella pneumoniae* Y7-3 may include: inoculating the *Klebsiella pneumoniae* Y7-3 into a fermentation medium, and conducting culture at 35° C. to 39° C. (such as 35° C. to 37° C., 37° C. to 39° C., 35° C., 37° C., or 39° C.) and 160 rpm to 200 rpm (such as 160 rpm to 180rpm, 180 rpm to 200rpm, 160 rpm, 180 rpm, or 200 rpm) for 22 h to 26 h (such as 22 h to 24 h, 24 h to 26 h, 22 h, 24 h, or 26 h).

Further, 1.5 mL of a *Klebsiella pneumoniae* Y7-3 seed liquid with an $OD_{600\ nm}$ value of 1.2 to 1.8 (such as 1.2 to 1.5, 1.5 to 1.8, 1.2, 1.5, or 1.8) may be inoculated into 20 mL of the fermentation medium.

Further, the fermentation medium may be obtained by sterilizing a nitrogen source aqueous solution; and the nitrogen source aqueous solution may have a nitrogen content of 0.10% to 0.15% (such as 0.10% to 0.127%, 0.127% to 0.15%, 0.10%, 0.127%, or 0.15%). The nitrogen source may be peptone, a yeast extract powder, corn steep liquor, a yeast powder, urea, ammonium sulfate, ammonium nitrate, or triammonium citrate.

When the nitrogen source is the peptone, a peptone aqueous solution may have a concentration of specifically 10 g/L.

When the nitrogen source is the yeast extract powder, a yeast extract powder aqueous solution may have a concentration of specifically 14.1 g/L.

When the nitrogen source is a yeast powder YP-100, a yeast powder YP-100 aqueous solution may have a concentration of specifically 17.64 g/L.

When the nitrogen source is a yeast powder YP-600, a yeast powder YP-600 aqueous solution may have a concentration of specifically 15.88 g/L.

When the nitrogen source is the corn steep liquor, a corn steep liquor aqueous solution may have a concentration of specifically 31.75 g/L.

When the nitrogen source is the urea, a urea aqueous solution may have a concentration of specifically 2.72 g/L.

When the nitrogen source is the ammonium sulfate, an ammonium sulfate aqueous solution may have a concentration of specifically 5.99 g/L.

When the nitrogen source is the ammonium nitrate, an ammonium nitrate aqueous solution may have a concentration of specifically 3.63 g/L.

When the nitrogen source is the triammonium citrate, a triammonium citrate aqueous solution may have a concentration of specifically 7.35 g/L.

Further, the fermentation medium may be obtained by mixing an LB liquid medium with corn stover and sterilizing. In the fermentation medium, the corn stover may have a concentration of 10 g/L, 20 g/L, 35 g/L, 50 g/L, or 70 g/L.

Any of the carbon sources may be organic carbon sources and/or inorganic carbon sources.

Any of the carbon sources may be rich in cellulose and/or hemicellulose.

Any of the nitrogen sources may be organic nitrogen sources and/or inorganic nitrogen sources.

Any of the carbon sources may be plant straw or plant skin. The plant may be at least one of corn, wheat, barley, sorghum, *Caragana korshinskii*, and *Salix cheilophila*.

Any of the organic carbon sources may be corn stover and/or corn husk.

Any of the inorganic carbon sources may be at least one of glucose, xylose, sucrose, starch, and carboxymethyl cellulose.

Any of the organic nitrogen sources may be at least one of the peptone, the yeast extract powder, the corn steep liquor, and the yeast powder.

Any of the inorganic nitrogen sources may be at least one of the urea, the ammonium sulfate, the ammonium nitrate, and the triammonium citrate.

Experiments have shown that the *Klebsiella pneumoniae* Y7-3 can degrade corn stover rich in cellulose and hemicellulose, specifically, the corn stover can be degraded into acetic acid, ethanol, and hydrogen; the *Klebsiella pneumoniae* Y7-3 can degrade different nitrogen sources (including organic nitrogen sources and inorganic nitrogen sources), specifically the nitrogen sources can be degraded into acetic acid, ethanol, 1,3-propanediol, lactic acid, and hydrogen; and the *Klebsiella pneumoniae* Y7-3 also produces exoglucanase, endoglucanase, and/or β-glucosidase (all extracellular enzyme). It can be seen that the *Klebsiella pneumoniae* Y7-3 can degrade cellulose and/or hemicellulose, can also degrade carbon and/or nitrogen sources, and can also produce at least one kind of product including acetic acid, ethanol, 1,3-propanediol, lactic acid, and hydrogen. The present disclosure has important application values.

DESCRIPTION OF PRESERVATION

Figure 1:
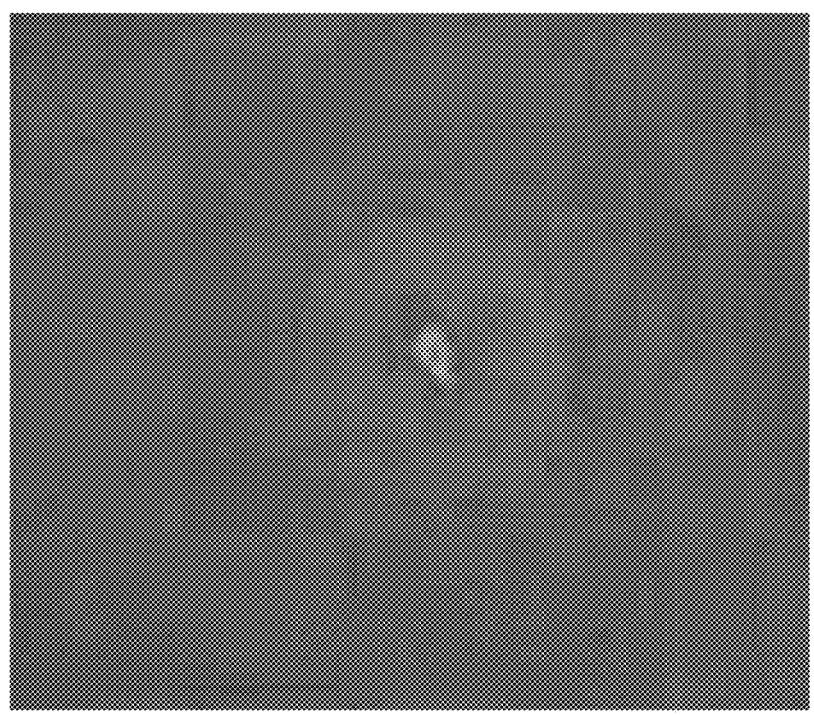
FIG. 1 shows a cellulose-degrading ability of a cellulose-degrading bacterium Y7-3 by a plate transparent zone method.

Species name: *Klebsiella pneumoniae*
Strain number: Y7-3
Preservation institution: China Center for Type Culture Collection
Short Name of Preservation Institution: CCTCC
Address: Wuhan University, China
Date of Preservation: Thursday, Oct. 24, 2019
Registration number in the Collection Center: CCTCC NO: M2019851

DETAILED DESCRIPTION OF THE EMBODIMENTS

The following examples facilitate a better understanding of the present disclosure, but do not limit the present disclosure.

Experimental methods in the following examples are conventional methods, unless otherwise specified.

Unless otherwise specified, the test materials used in the following examples are all commercially available from conventional biochemical reagent stores.

In the quantitative experiments of the following examples, triplicate experiments are set up, and the results are averaged.

LB liquid medium: adding distilled water to 10 g of peptone, 5 g of a yeast extract powder and 10 g of sodium chloride, adjusting a pH value to 7.0, adjusting a volume to 1 L, sterilizing at 121° C. for 20 min, and cooling for use.

LB solid medium: adding agar to the LB liquid medium to make a concentration to be 15 g/L; and sterilizing at 121° C. for 20 min. The medium cooled to about 55° C. is poured into a petri dish and allowed to cool in room temperature.

Congo red plate: dissolving 10.0 g of CMC-Na, 5.0 g of NaCl, 1.0 g of $KH_2PO_4$, 0.2 g of $MgSO_4$, 10.0 g of the yeast extract powder, and 18.0 g of Agar in an appropriate amount of distilled water, diluting to 1 L with the distilled water, and adjusting a pH value to 7.0; conducting autoclaving at 121° C. for 15 min; after being cooled to about 55° C., pouring the medium into a sterile petri dish and cooling in room temperature to obtain the Congo red plate.

A MAC medium is a product of Beijing Solarbio Science & Technology Co., Ltd.

Example 1

Isolation, Identification and Preservation of *Klebsiella pneumoniae* Y7-3 CCTCC NO: M2019851

I. Isolation of a Cellulose-Degrading Bacterium Y7-3
  1. 0.6 mL of a bovine rumen sample (collected from Xikouzi Slaughterhouse, Hohhot, Inner Mongolia Autonomous Region, China) was added to a shake flask (50 mL) containing 30 mL of an LB liquid medium, and mixed well; and shaking culture was conducted at 37° C. and 180 rpm for 12 h to obtain a cultured bacterial solution.
  2. 1 mL of the cultured bacterial solution was added into a sterile test tube containing 9 mL of sterile water and mixed thoroughly (a dilution at this time was recorded as $10^{-1}$); 1 mL of sample was drawn from the test tube and added to another sterile test tube containing 9 mL of the sterile water and mixed well; similarly, bacterial solutions with different dilutions were prepared at $10^{-2}$, $10^{-3}$, $10^{-4}$, $10^{-5}$, $10^{-6}$, $10^{-7}$, and $10^{-8}$. 0.1 mL of each dilution was evenly spread on the MacConkey Agar (MAC)medium, and cultured at 37° C. for 1 d. The pink or red colonies were purified more than 3 times on the MAC medium.

3. The initial screening of cellulose degradation ability was conducted by a plate transparent zone method. 2 μL of a bacterial suspension of each strain purified in step 2 was inoculated onto a Congo red plate (each strain was repeated 3 times on one plate and a bacterial content in the bacterial suspension of each strain was the same), and cultured at 37° C. for 24 h; the strain was stained with a 1% (m/v) Congo red staining solution for 1 h; and the strain was decolorized by a 0.9% (m/v) NaCl aqueous solution, and then observed.

A strain forming a large transparent zone on the Congo red plate (that is, the strain could degrade cellulose) was screened, as shown in FIG. 1, and named as cellulose-degrading bacterium Y7-3.

II. Identification of the Cellulose-Degrading Bacterium Y7-3

1. Colony Morphological Identification

The cellulose-degrading bacterium Y7-3, in a logarithmic growth phase and with a stable colony size obtained by separation and purification of step 1, was subjected to single colony state observation, mainly including the colony size, color, transparency, and wetness, the colony surface state (whether it was flat, protruding, folded, and concave), and the colony edge status (whether it was neat, irregular, and radial).

The results showed that the cellulose-degrading bacterium Y7-3 had round, light red, and opaque colonies with a diameter of 2.0 mm to 4.0 mm, neat edges and a smooth and moist surface.

2. Identification of Physiological and Biochemical Characteristics

The physiological and biochemical characteristics of cellulose-degrading bacterium Y7-3 was identified by a single-box biochemical identification kit (product of Guangdong Huankai Microbial Sci. & Tech. Co., Ltd.). The specific operation steps were as follows:

1) Under sterile conditions, an aluminum cap of a biochemical identification tube was opened (a component in the single-box biochemical identification kit).

2) The cellulose-degrading bacterium Y7-3 strain cultured to the logarithmic phase was diluted with sterile physiological saline to obtain a diluent with a concentration of $10^8$ cfu/mL; 1 to 2 drops of the diluent was inoculated into the biochemical identification tube, and incubated at 37° C. and 180 r/min; the color change was observed within a specified time according to instructions of the kit, to obtain the corresponding physiological and biochemical characteristics.

All used biochemical identification tubes were autoclaved before waste disposal.

The physiological and biochemical characteristics of cellulose-degrading bacterium Y7-3 were shown in Table 1.

TABLE 1

Physiological and biochemical characteristics of cellulose-degrading bacterium Y7-3

| Physiological and biochemical characteristics | Experimental results | Physiological and biochemical characteristics | | Experimental results |
|---|---|---|---|---|
| Malonate | + | Fermentation of sugar and alcohol | D-glucose | + |
| Citrate utilization | + | | D-sucrose | + |
| Methyl red | − | | D-lactose | + |
| Citrate | + | | D-galactose | + |
| Lysine dehydrogenase | + | | L-arabinose | + |
| V.P test | + | | D-fructose | + |
| | | | Xylose | + |
| | | | Glycerin | + |
| | | | Dulcitol | + |

"+" represent positive reaction,
"+" represent negative reaction

3. Homology analysis of 16S rDNA Sequences (1) A genomic DNA of the cellulose-degrading bacterium Y7-3 was extracted and used as a template for PCR amplification using a primer pair including a primer 27F: 5'-AGAGTTTGATCCTGGCTCAG-3' (SEQ ID NO: 2) and a primer 1492R: 5'-GGTTACCTTGTTACGACTT-3' (SEQ ID NO: 3), to obtain a PCR amplification product.

A reaction system was 50 μL, including: 25 μL of an Es Taq MasterMix (Beijing TransGen Biotech Co., Ltd.), 2 μL of a primer 27F aqueous solution (concentration 2.5 pmol/μL), 2 μL of a primer 1492R aqueous solution (concentration 2.5 pmol/μL), 1 μL of the template, and 20 μL of ddH$_2$O. The reaction was conducted by: 95° C. for 10 min; 95° C. for 30 sec, 56° C. for 30 sec, and 72° C. for 90 sec, conducting 30 cycles; and 74° C. for 10 min.

(2) A PCR amplification product obtained in step (1) was sequenced.

The sequencing results showed that the PCR amplification product obtained in step (1) included a DNA molecule shown in SEQ ID NO: 1.

A nucleotide sequences shown in SEQ ID NO: 1 were aligned on NCBI. The comparison results showed that the cellulose-degrading bacterium Y7-3 had the highest homology with *Klebsiella pneumoniae*, reaching 99%. Therefore, the cellulose-degrading bacterium Y7-3 was identified as *Klebsiella pneumoniae*.

III. Preservation

The cellulose-degrading bacterium Y7-3 has been deposited in the China Center for Type Culture Collection (CCTCC) in Wuhan University, China on Oct. 24, 2019, with a deposit number of CCTCC NO: M2019851. The cellulose-degrading bacterium Y7-3 has a full name of *Klebsiella pneumoniae* Y7-3 CCTCC NO: M2019851, and is referred to as *Klebsiella pneumoniae* Y7-3 for short.

EXAMPLE 2

Use of *Klebsiella pneumoniae* Y7-3 CCTCC NO: M2019851

High-performance liquid chromatography (HPLC) method included the following detection conditions: a detector was a Waters 2414 Differential Refractive Index Detector (RID); a chromatographic column was an Aminex HPX-87H column (300 mm×7.8 mm id, 9μm) from Bio-Rad, U.S; a mobile phase is an aqueous $H_2SO_4$ solution with a concentration of 5 mmol/L; a mobile phase flow rate was 0.5 mL/min; an injection volume was 20 μL; and a column temperature was 50° C.

I. Plotting of a Standard Curve

1. Plotting of a Lactic Acid Standard Curve 2.0000 g of a lactic acid standard product was accurately weighed into a 1 L volumetric flask, dissolved with 25 mL of a 10% (v/v) aqueous $H_2SO_4$ solution, diluted to 1 L with water, and shaken well to prepare a lactic acid stock solution with a concentration of 2000 mg/L. The lactic acid stock solution was diluted with water to obtain lactic acid standard solutions with concentrations of 10, 20, 40, 60, 80 and 100 mg/L separately. The peak areas of lactic acid standard solutions with different concentrations were detected by HPLC, repeated three times. The lactic acid standard curve was plotted with the concentration of lactic acid as the abscissa and the peak area as the ordinate.

The lactic acid standard curve was: y=113.55726x-216.79178 ($R^2$=0.997); where y is the peak area and x is the lactic acid concentration.

2. Plotting of an Acetic Acid Standard Curve 2.0000 g of an acetic acid standard product was accurately weighed into a 1 L volumetric flask, dissolved with 25 mL of a 10% (v/v) aqueous $H_2SO_4$ solution, diluted to 1 L with water, and shaken well to prepare an acetic acid stock solution with a concentration of 2000 mg/L. The acetic acid stock solution was diluted with water to obtain acetic acid standard solutions with concentrations of 10, 20, 40, 60, 80 and 100 mg/L separately. The peak areas of acetic acid standard solutions with different concentrations were detected by HPLC, repeated three times. The acetic acid standard curve was plotted with the concentration of acetic acid as the abscissa and the peak area as the ordinate.

The acetic acid standard curve was: y=95.63793x+27.78082 ($R^2$=0.999); where y is the peak area and x is the acetic acid concentration.

3. Plotting of a 1,3-propanediol Standard Curve 2.0000 g of a 1,3-propanediol standard product was accurately weighed into a 1 L volumetric flask, dissolved with 25 mL of a 10% (v/v) aqueous $H_2SO_4$ solution, diluted to 1 L with water, and shaken well to prepare a 1,3-propanediol stock solution with a concentration of 2000 mg/L. The 1,3-propanediol mother liquor was diluted with water to obtain 1,3-propanediol standard solutions with concentrations of 10, 20, 40, 60, 80 and 100 mg/L separately. The peak areas of 1,3-propanediol standard solutions with different concentrations were detected by HPLC, repeated three times. The 1,3-propanediol standard curve was plotted with the concentration of 1,3-propanediol as the abscissa and the peak area as the ordinate.

The 1,3-propanediol standard curve was: y=157.43206x+1.84384 ($R^2$=0.999); where y is the peak area and x is the 1,3-propanediol concentration.

4. Plotting of an Ethanol Standard Curve 2.0000 g of an ethanol standard product was accurately weighed into a 1 L volumetric flask, dissolved with 25 mL of a 10% (v/v) aqueous $H_2SO_4$ solution, diluted to 1 L with water, and shaken well to prepare an ethanol stock solution with a concentration of 2000 mg/L. The ethanol mother liquor was diluted with water to obtain ethanol standard solutions with concentrations of 10, 20, 40, 60, 80 and 100 mg/L separately. The peak areas of ethanol standard solutions with different concentrations were detected by HPLC, repeated three times. The ethanol standard curve was plotted with the concentration of ethanol as the abscissa and the peak area as the ordinate.

The ethanol standard curve was: y=86.49781x+64.44658 ($R^2$=0.999); where y is the peak area and x is the ethanol concentration.

5. Plotting of a Glucose Standard Curve 2.0000 g of a glucose standard product was accurately weighed into a 1 L volumetric flask, dissolved with 25 mL of a 10% (v/v) aqueous $H_2SO_4$ solution, diluted to 1 L with water, and shaken well to prepare a glucose stock solution with a concentration of 2000 mg/L. The glucose stock solution was diluted with water to obtain glucose standard solutions with concentrations of 10, 20, 40, 60, 80 and 100 mg/L separately. The peak areas of glucose standard solutions with different concentrations were detected by HPLC, repeated three times. The glucose standard curve was plotted with the concentration of glucose as the abscissa and the peak area as the ordinate.

The glucose standard curve was: y=210.34411x+237.88767 ($R^2$=0.999); where y is the peak area and x is the glucose concentration.

6. Plotting of a Xylose Standard Curve 2.0000 g of a xylose standard product was accurately weighed into a 1 L volumetric flask, dissolved with 25 mL of a 10% (v/v) aqueous $H_2SO_4$ solution, diluted to 1 L with water, and shaken well to prepare a xylose stock solution with a concentration of 2000 mg/L. The xylose stock solution r was diluted with water to obtain xylose standard solutions with concentrations of 10, 20, 40, 60, 80 and 100 mg/L separately. The peak areas of xylose standard solutions with different concentrations were detected by HPLC, repeated three times. The xylose standard curve was plotted with the concentration of xylose as the abscissa and the peak area as the ordinate.

The xylose standard curve was: y=204.71425x+26.59726 ($R^2$=0.999); where y is the peak area and x is the xylose concentration.

II. Detection of Degradation Rates of Cellulose and Hemicellulose

1. Preparation of a Standard Sample
   (1) 0.05 g of glucose, 0.05 g of xylose and 1 mL of a 74% (v/v) sulfuric acid aqueous solution were added in a rolling tube, acidified at 30° C. for 60 min, and immediately treated in an ice bath (to terminate the reaction).
   (2) after step (1), 28 mL of water was added to the sample, and treated in a high-pressure steam sterilizer at 121° C. for 60 min; the sample was transferred before the temperature dropped to 100° C. (to prevent excessive sugar loss), to obtain the standard sample treatment solution.

2. Obtaining a Sample Treatment Solution
   (1) A fermentation broth was centrifuged at 8,000 rpm for 10 min, and a precipitate was collected as a sample.
   (2) The sample obtained in step (1) was dried in a freeze dryer to a constant weight; where the weight was recorded as $G_{sample}$.
   (3) 0.025 g of a solid obtained in step (2) and 0.25 mL of the 74% (v/v) sulfuric acid aqueous solution were added in a rolling tube, acidified at 30° C. for 60 min, and immediately treated in an ice bath (to terminate the reaction).

(4) after step (3), 7 mL of water was added to the sample, and treated in a high-pressure steam sterilizer at 121° C. for 60 min; the sample was transferred before the temperature dropped to 100° C. (to prevent excessive sugar loss), to obtain the sample treatment solution.

3. Obtaining Degradation Rates of Cellulose and Hemicellulose
   (1) The standard sample treatment solution or sample treatment solution was centrifuged at 8,000 rpm for 5 min, and a supernatant was collected.
   (2) After step (1), the supernatant was filtered with a water-based needle filter (0.22 μm), and a filtrate was collected.
   (3) A peak area $S_{monosaccharide}$ of monosaccharides in the filtrate collected in step (2) was detected using HPLC; a glucose content $C_G$ and a xylose content $C_X$ in the sample treatment solution were obtained according to the glucose standard curve and the xylose standard curve; further, the glucose content and the xylose content in the sample were obtained, and a sum of the glucose content and the xylose content in the sample was a mass of the sugar after adding sulfuric acid, denoted as $M_{mass\ of\ the\ sugar\ after\ adding\ sulfuric\ acid}$.
   (4) A peak area of monosaccharides in the sample collected in step (2) was detected using HPLC; a glucose content and a xylose content in the sample were obtained according to the glucose standard curve and the xylose standard curve; and a sum of the glucose content and the xylose content in the sample was a mass of the sugar before adding sulfuric acid, denoted as $M_{mass\ of\ the\ sugar\ before\ adding\ sulfuric\ acid}$.
   (5) The cellulose degradation rate and the hemicellulose degradation rate of the sample were obtained according to formula a to formula g.

A loss rate of acid hydrolysis was calculated according to formula a, denoted as W;

$$W = \frac{M_{mass\ of\ the\ sugar\ after\ adding\ sulfuric\ acid}}{M_{mass\ of\ the\ sugar\ before\ adding\ sulfuric\ acid}} \times 100. \quad \text{(formula a)}$$

A mass of glucose in the sample was calculated according to formula b, denoted as $M_G$; $M_G = C_G \times V_{sample} \times (1 \times W) \times G_{sample}/0.025$ (formula b); where $V_{sample}$ was a volume of the sample.

A mass of xylose in the sample was calculated according to formula c, denoted as $M_X$; $M_X = C_X \times V_{sample} \times (1+W) \times G_{sample}/0.025$ (formula c); where $V_{sample}$ was the volume of the sample.

A mass of remaining xylan was calculated according to formula d, denoted as $M_{Glucan}$;

$$M_{Xylan} = M_X \times \frac{132}{150}. \quad \text{(formula d)}$$

A mass of remaining glucose was calculated according to formula e, denoted as $M_{Glucan}$;

$$M_{Glucan} = M_G \times \frac{162}{180}. \quad \text{(formula e)}$$

A hemicellulose degradation rate was calculated according to formula f; the hemicellulose degradation rate was $$1 - \frac{M_{xylan}}{M_{mass\ of\ xylan\ in\ corn\ stover}} \times 100\%. \quad \text{(formula f)}$$

A cellulose degradation rate was calculated according to formula g; the cellulose degradation rate was $$1 - \frac{M_{Glucan}}{M_{mass\ of\ glucan\ in\ corn\ stover}} \times 100\%. \quad \text{(formula g)}$$

III. Use of *Klebsiella pneumoniae* Y7-3 CCTCC NO: M2019851 in Degradation of Different Carbon Sources to Produce Acetic Acid, Ethanol, and Hydrogen Carbon source to be tested 1: glucose.

Carbon source to be tested 2: xylose.

Carbon source to be tested 3: sucrose.

Carbon source to be tested 4: starch

Carbon source to be tested 5: carboxymethyl cellulose

Carbon source to be tested 6: corn stover

Carbon source to be tested 7: corn husk

Carbon source to be tested 1 to carbon source to be tested 5 were inorganic carbon sources, and carbon source to be tested 6 and carbon source to be tested 7 were organic carbon sources.

Three parallel samples were set for each carbon source to be tested, and results were averaged. A method included the following specific steps:

1. The carbon source to be tested was added in a penicillin bottle (100 mL) containing 20 mL of an LB liquid medium, and mixed well to obtain a medium with a concentration of the carbon source to be tested of 10 g/L; the bottle was vacuumized and filled with nitrogen (to maintain an anaerobic environment), and sterilized at 121° C. and 0.1 Mpa for 20 min to obtain a fermentation medium.

2. After step 1, the fermentation medium was cooled to room temperature, and 1.5 mL of a seed liquid of *Klebsiella pneumoniae* Y7-3 with an $OD_{600}$ nm value of 1.5 was added to obtain a corresponding initial system.

3. After step 2, the initial system was cultured at 37° C. and 180 rpm for 24 h to obtain the corresponding fermentation broth.

The gas produced during fermentation was detected using gas chromatography. The chromatographic model was SP-3420A, a column model was TDX-1 packed column, a column temperature was 160° C., a detector temperature was 160° C., a heating wire was 180° C., and high-purity nitrogen was used as a carrier gas.

The results show that hydrogen is mainly produced during the fermentation culture. The production of hydrogen is shown in row 2 in Table 2.

TABLE 2

|  | Glucose | Xylose | Sucrose | Carboxymethyl cellulose | Corn stover | Corn husk |
|---|---|---|---|---|---|---|
| Hydrogen production (mL/L) | $1472.5 \pm 11.88^{Aa}$ | $1128.62 \pm 66.13^{Bb}$ | $846.56 \pm 15.46^{Cc}$ | $277.26 \pm 2.35^{Dd}$ | $234.67 \pm 14.29^{Ee}$ | $134.35 \pm 2.26^{Ff}$ |
| Acetic acid (g/L) | $1.40 \pm 0.04^{Aa}$ | $1.11 \pm 0.11^{Bb}$ | $0.87 \pm 0.05^{Cc}$ | $0.33 \pm 0.04^{Dd}$ | $0.34 \pm 0.003^{Dd}$ | $0.26 \pm 0.012^{Ee}$ |
| Ethanol (g/L) | $0.63 \pm 0.01^{Aa}$ | $0.60 \pm 0.01^{Aa}$ | $0.48 \pm 0.01^{Bb}$ | $0 \pm 0^{Cc}$ | $0 \pm 0^{Cc}$ | $0 \pm 0^{Cc}$ |
| Lactic acid (g/L) | $0.14 \pm 0.01^{Aa}$ | $0.10 \pm 0.003^{Bb}$ | $0.0759 \pm 0.015^{Cc}$ | $0 \pm 0^{Dd}$ | $0 \pm 0^{Dd}$ | $0 \pm 0^{Dd}$ |

Note:
the data were presented as mean values ± standard deviation, the different upper case letters on the shoulder were presented as a significant difference (P < 0.05), the different lower case letters on the shoulder were presented as a significant difference (P < 0.01)

4. After step 3, the fermentation broth was centrifuged at 8,000 rpm for 10 min, and a corresponding supernatant was collected.

5. After step 4, 50 μL of a 10% (v/v) $H_2SO_4$ solution was added to 2 mL of the supernatant, and mixed well; a mixture was filtered with a 0.22 μm water-based needle filter, and a corresponding filtrate was collected.

6. The filtrate was detected by HPLC, contents of the lactic acid, acetic acid and ethanol in the corresponding filtrate were obtained according to the corresponding peak area and standard curve, and contents of the lactic acid, acetic acid and ethanol in the corresponding fermentation broth were further obtained.

The test results are shown in row 3, row 4 and row 5 in Table 2. The results show that each fermentation broth includes acetic acid, with a highest content of 1.4 g/L when the carbon source is glucose; when the carbon source is glucose, xylose or sucrose, the fermentation broth includes lactic acid and ethanol, which have maximum values of 0.14 g/L and 0.63 g/L when the carbon source is glucose, respectively.

The above results show that the *Klebsiella pneumoniae* Y7-3 CCTCC NO: M2019851 can degrade and utilize different carbon sources (including organic carbon sources and inorganic carbon sources); specifically, the carbon sources can be metabolized into acetic acid, ethanol, lactic acid, and hydrogen.

IV. Use of *Klebsiella pneumoniae* Y7-3 CCTCC NO: M2019851 in Degradation of Corn Stover (Rich in Cellulose and Hemicellulose) to Produce Acetic Acid, Ethanol, and Hydrogen Three parallel samples were set for each corn stover concentration, and results were averaged. A method included the following specific steps:

1. 0.2 g, 0.4 g, 0.7 g, 1.0 g, and 1.4 g of the corn stover were separately added in a penicillin bottle (100 mL) containing 20 mL of an LB liquid medium, and mixed well; the bottle was vacuumized and filled with nitrogen (to maintain an anaerobic environment), and sterilized at 121° C. and 0.1 Mpa for 20 min to obtain fermentation media with a corn stover concentration of 10 g/L, 20 g/L, 35 g/L, 50 g/L, and 70 g/L in sequence.

2. After step 1, the fermentation medium was cooled to room temperature, and 1.5 mL of a seed liquid of *Klebsiella pneumoniae* Y7-3 with an $OD_{600}$ nm value of 1.5 was added to obtain a corresponding initial system.

3. After step 2, the initial system was cultured at 37° C. and 180 rpm for 24 h to obtain the corresponding fermentation broth.

The gas produced during fermentation was detected using gas chromatography. The chromatographic model was SP-3420A, a column model was TDX-1 packed column, a column temperature was 160° C., a detector temperature was 160° C., a heating wire was 180° C., and high-purity nitrogen was used as a carrier gas.

The results show that hydrogen is a main product during the fermentation culture. The production and yield of hydrogen is shown in row 2 and row 3 in Table 3. Yield=hydrogen production/gas production during fermentation culture× 100%.

TABLE 3

|  | Corn stover concentration (g/L) | | | | |
|---|---|---|---|---|---|
|  | 10 | 20 | 35 | 50 | 70 |
| Hydrogen production (mL/L) | $94.04 \pm 6.9^{Cc}$ | $134.91 \pm 20.78^{Cc}$ | $295.15 \pm 33.81^{Bb}$ | $403.41 \pm 5.62^{Aa}$ | $348.01 \pm 25.52^{ABb}$ |
| Hydrogen yield (mmol $H_2$/g DM) | $0.42 \pm 0.01^{Aa}$ | $0.30 \pm 0.03A^{Bbc}$ | $0.38 \pm 0.02^{Aab}$ | $0.36 \pm 0.01^{Aab}$ | $0.22 \pm 0.02^{Bc}$ |
| Cellulose degradation rate (%) | $21.35 \pm 1.85^{Ab}$ | $21.77 \pm 1.40^{Aab}$ | $19.62 \pm 0.85^{Ab}$ | $23.07 \pm 0.95^{Aa}$ | $18.29 \pm 1.63^{Bc}$ |
| Hemicellulose degradation rate (%) | $5.72 \pm 1.21^{Aa}$ | $3.22 \pm 1.70^{Aa}$ | $5.37 \pm 0.54^{Aa}$ | $6.93 \pm 1.10^{Aa}$ | $0.88 \pm 0.05^{Bb}$ |
| Acetic acid (g/L) | $0.34 \pm 0.003^{Cc}$ | $0.51 \pm 0.07B^{Cb}$ | $0.62 \pm 0.04^{Bb}$ | $1.03 \pm 0.08^{Aa}$ | $0.93 \pm 0.01^{Aa}$ |
| Ethanol (g/L) | $0 \pm 0^{Bb}$ | $0 \pm 0^{Bb}$ | $0 \pm 0^{Bb}$ | $0.61 \pm 0.06^{Aa}$ | $0.64 \pm 0.02^{Aa}$ |

Note:
same as table 2.

4. After step 3, the fermentation broth was centrifuged at 8,000 rpm for 10 min, and a corresponding supernatant was collected.

5. After step 4, 50 μL of a 10% (v/v) $H_2SO_4$ solution was added to 2 mL of the supernatant, and mixed well; a mixture was filtered with a 0.22 μm water-based needle filter, and a corresponding filtrate was collected.

6. The filtrate was detected by HPLC, contents of the acetic acid and ethanol in the corresponding filtrate were obtained according to the corresponding peak area and standard curve, and contents of the acetic acid and ethanol in the corresponding fermentation broth were further obtained.

The test results are row 6 and row 7 in Table 3. The results show that each fermentation broth includes acetic acid, and when the concentration of corn stover is 50 g/L, the acetic acid has the highest content; some fermentation broths include ethanol, and when the corn stover concentration is 70 g/L, the ethanol has the highest content.

7. After step 3, the fermentation broth was subjected to detection of the degradation rates of cellulose and hemicellulose.

The test results are row 4 and row 5 in Table 3. The results show that each corn stover was degraded to a certain extent; when the concentration of corn stover is 70 g/L, the cellulose and hemicellulose each have the highest degradation rate.

The above results show that the *Klebsiella pneumoniae* Y7-3 CCTCC NO: M2019851 can degrade the corn stover; specifically, the corn stover can be metabolize into acetic acid, ethanol, and hydrogen.

V. Use of *Klebsiella pneumoniae* Y7-3 CCTCC NO: M2019851 in degradation of different nitrogen sources to produce acetic acid, ethanol, 1,3-propanediol, lactic acid, and hydrogen Corn stover: collected in suburbs of Hohhot with a kind of Huanong.

Nitrogen source to be tested 1: peptone (OXOID).

Nitrogen source to be tested 2: a yeast extract powder (Guangdong Huankai Microbial Sci. & Tech. Co., Ltd.).

Nitrogen source to be tested 3: corn steep liquor (Inner Mongolia Fufeng Biotechnology Co., Ltd.).

Nitrogen source to be tested 4: a yeast powder YP-100 (Angel Yeast Co., Ltd.).

Nitrogen source to be tested 5: a yeast powder YP-600 (Angel Yeast Co., Ltd.).

Nitrogen source to be tested 6: urea (Tianjin Fengchuan Chemical Reagent Technologies Co., Ltd.).

Nitrogen source to be tested 7: ammonium sulfate (Tianjin Fuchen Chemical Reagent Factory).

Nitrogen source to be tested 8: ammonium nitrate (Tianjin Fengchuan Chemical Reagent Technologies Co., Ltd.).

Nitrogen source to be tested 9: triammonium citrate (Sinopharm Chemical Reagent Co., Ltd.).

Nitrogen source to be tested 1 to nitrogen source to be tested 5 were organic nitrogen sources, and nitrogen source to be tested 6 to nitrogen source to be tested 9 were inorganic nitrogen sources.

Three parallel samples were set for each nitrogen source to be tested, and results were averaged. A method included the following specific steps:

1. A penicillin bottle (100 mL) containing 20 mL of a nitrogen source aqueous solution to be tested was sterilized at 121° C. and 0.1 Mpa for 20 min to obtain a fermentation medium.

The nine nitrogen source aqueous solutions to be tested each had a nitrogen content of 0.127%. Specifically, the peptone in nitrogen source aqueous solution to be tested 1 had a concentration of 10 g/L; the yeast extract powder in nitrogen source aqueous solution to be tested 2 had a concentration of 14.1 g/L; the yeast powder YP-100 in nitrogen source aqueous solution to be tested 3 had a concentration of 17.64 g/L; the yeast powder YP-600 in nitrogen source aqueous solution to be tested 4 had a concentration of 15.88 g/L; the corn steep liquor in nitrogen source aqueous solution to be tested 5 had a concentration of 31.75 g/L; the urea in nitrogen source aqueous solution to be tested 6 had a concentration of 2.72 g/L; the ammonium sulfate in nitrogen source aqueous solution to be tested 7 had a concentration of 5.99 g/L; the ammonium nitrate in nitrogen source aqueous solution to be tested 8 had a concentration of 3.63 g/L; and the triammonium citrate in nitrogen source aqueous solution to be tested 9 had a concentration of 7.35 g/L.

2. After step 1, the fermentation medium was cooled to room temperature, and 1.5 mL of a seed liquid of *Klebsiella pneumoniae* Y7-3 with an $OD_{600\,nm}$ value of 1.5 was added to obtain an initial system.

3. After step 2, the initial system was cultured at 37° C. and 180 rpm for 24 h to obtain the fermentation broth.

The gas produced during fermentation was detected using gas chromatography. The chromatographic model was SP-3420A, a column model was TDX-1 packed column, a column temperature was 160° C., a detector temperature was 160° C., a heating wire was 180° C., and high-purity nitrogen was used as a carrier gas.

The results show that hydrogen is mainly produced during the fermentation culture. The production of hydrogen is shown in row 2 in Table 4.

TABLE 4-1

| | Nitrogen source type | | | |
| --- | --- | --- | --- | --- |
| | Peptone | Yeast extract powder | Yeast powder YP-100 | Yeast powder YP-600 |
| Hydrogen production (mL/L) | $373.94 \pm 4.97^{BCb}$ | $410.28 \pm 26.4^{ABa}$ | $355.88 \pm 7.49^{Cbc}$ | $430.31 \pm 20.05^{Aa}$ |
| Cellulose degradation rate (%) | $20.61 \pm 1.64^{BCDc}$ | $21.16 \pm 0.55^{B\ CDc}$ | $16.63 \pm 0.52^{Dd}$ | $20.71 \pm 1.93^{BCDc}$ |
| Hemicellulose degradation rate (%) | $2.94 \pm 0.96^{Bc}$ | $5.15 \pm 0.55^{Bbc}$ | $5.5 \pm 0.21^{Bb}$ | $3.46 \pm 1.48^{Bbc}$ |
| Acetic acid (g/L) | $1.14 \pm 0.01^{Bb}$ | $1.41 \pm 0.01^{Aa}$ | $1.11 \pm 0.02^{Bb}$ | $1.16 \pm 0.03^{Bb}$ |
| Ethanol (g/L) | $0.33 \pm 0.03^{DCd}$ | $0.39 \pm 0.07^{Cc}$ | $1.6 \pm 0.03^{Aa}$ | $0.4 \pm 0.02^{Cc}$ |
| 1,3-propanediol (g/L) | $0 \pm 0^{Ca}$ | $0.71 \pm 0.01^{Aa}$ | $0.65 \pm 0.03^{Aa}$ | $0.61 \pm 0.01^{Aa}$ |
| Lactic acid (g/L) | $0 \pm 0^{Dd}$ | $0 \pm 0^{Dd}$ | $0.52 \pm 0.02^{Bb}$ | $0.97 \pm 0.06^{Aa}$ |

Note:
same as table 2.

TABLE 4-2

| | Nitrogen source type | | | | |
|---|---|---|---|---|---|
| | Corn steep liquor | Urea | Ammonium sulfate | Ammonium nitrate | Triammonium citrate |
| Hydrogen production (mL/L) | 14.87 ±2.45$^{Fg}$ | 99.38 ± 8.18$^{Ef}$ | 204.69 ± 5.3$^{Dd}$ | 337.05 ± 10.31$^{Cc}$ | 171.88 ± 1.99$^{De}$ |
| Cellulose degradation rate (%) | 29.09 ± 1.65$^{Aa}$ | 20.21 ± 2.22$^{CDc}$ | 22.8 ± 1.5B$^{Cbc}$ | 25.07 ± 0.87$^{ABb}$ | 22.94 ± 0.47B$^{Cbc}$ |
| Hemicellulose degradation rate (%) | 14.93 ± 0.31$^{Aa}$ | 5.48 ± 1.12$^{Bb}$ | 5.28 ± 0.35$^{Bbc}$ | 14.24 ± 2.16$^{Aa}$ | 4.88 ± 1.26$^{Bbc}$ |
| Acetic acid (g/L) | 0.78 ± 0.001$^{De}$ | 1.01 ± 0.07$^{Cc}$ | 0.74 ± 0.01$^{De}$ | 1.01 ± 0.03$^{Cc}$ | 0.93 ± 0.01$^{Cd}$ |
| Ethanol (g/L) | 0 ± 0$^{Ef}$ | 0.69 ± 0.004$^{Bb}$ | 0 ± 0$^{Ef}$ | 0 ± 0$^{Ef}$ | 0.26 ± 0.01$^{De}$ |
| 1,3-propanediol (g/L) | 0.71 ± 0.11$^{Aa}$ | 0.28 ± 0.04$^{Bc}$ | 0.37 ± 0.003$^{Bbc}$ | 0 ± 0$^{Cd}$ | 0.4 ± 0.07$^{Bb}$ |
| Lactic acid (g/L) | 0 ± 0$^{Dd}$ | 0.14 ± 0.01$^{Cc}$ | 0 ± 0$^{Dd}$ | 0 ± 0$^{Dd}$ | 0 ± 0$^{Dd}$ |

Note:
same as table 2.

4. After step 3, the fermentation broth was centrifuged at 8,000 rpm for 10 min, and a supernatant was collected.
5. After step 4, 50 μL of a 10% (v/v) H$_2$SO$_4$ solution was added to 2 mL of the supernatant, and mixed well; a mixture was filtered with a 0.22 μm water-based needle filter, and a filtrate was collected.
6. The filtrate was detected by HPLC, contents of the acetic acid, ethanol, 1,3-propanediol and lactic acid in the filtrate were obtained according to the corresponding peak area and standard curve, and contents of the acetic acid, ethanol, 1,3-propanediol and lactic acid in the corresponding fermentation broth were further obtained.

The test results are in row 5 to row 8 in Table 4. The results show that each fermentation broth includes acetic acid, and the acetic acid has the highest content when the yeast extract powder is used as a nitrogen source; part of the fermentation broth includes ethanol, and when the yeast powder YP-100 is used as a nitrogen source, the ethanol has the highest content; part of the fermentation broth includes 1,3-propanediol, and when the corn steep liquor or yeast extract powder is used as a nitrogen source, the 1,3-propanediol has the highest content; and part of the fermentation broth includes lactic acid, and when the yeast powder YP-600 is used as a nitrogen source, the lactic acid has the highest content.

7. After step 3, the fermentation broth was subjected to detection of the degradation rates of cellulose and hemicellulose.

The test results are row 3 and row 4 in Table 4. The results show that each nitrogen source is degraded to a certain extent; when the corn steep liquor is used as a nitrogen source, cellulose and hemicellulose each have the highest degradation rate.

The above results show that *Klebsiella pneumoniae* Y7-3 CCTCC NO: M2019851 can degrade different nitrogen sources (including organic nitrogen sources and inorganic nitrogen sources); specifically, the nitrogen sources can be degraded into acetic acid, ethanol, 1,3-propanediol, lactic acid, and hydrogen.

Example 3

Detection of Activities in Exoglucanase, Endoglucanase and β-glucosidase of Microbial Inoculant Prepared by *Klebsiella pneumoniae* Y7-3

I. Preparation of a Crude Enzyme Solution

A single colony of *Klebsiella pneumoniae* Y7-3 was inoculated into a penicillin bottle containing 30 mL of an anaerobic medium with sodium carboxymethyl cellulose as a substrate, and cultured at 37° C. and 180 r/min for 12 h, 24 h, 48 h or 72 h, an obtained fermentation broth was centrifuged at 6,797×g for 5 min, and a supernatant was collected.

The supernatant was the crude enzyme solution.

II. Determination of Cellulase Activity

A buffer during the determination had a pH value of 6.8.

1. Preparation of a DNS Solution

Solution A: 3.15 g of 3,5-dinitrosalicylic acid was accurately weighed into 500 mL of distilled water, 5.0 g of sodium hydroxide was added, and a mixture was stirred in a water bath at 45° C. until the solution was transparent.

Solution B: 91.0 g of potassium sodium tartrate, 2.5 g of phenol, and 2.5 g of sodium sulfite were accurately weighed into 300 mL of water, and stirred evenly.

The solution A and the solution B were mixed and diluted to 1 L with water to obtain the DNS solution.

The DNS solution was filtered into a brown bottle, and stored in the dark for 7 d before use.

2. Plotting of a glucose standard curve

The endoglucanase could react with a substrate (a 1% CMC-Na solution) to degrade reducing sugar; the reducing sugar could react with a DNS reagent to produce amino compounds, which had an absorbance at 540 nm wavelength. Since the absorbance was proportional to a reducing sugar concentration, a standard curve was plotted with the glucose concentration as the abscissa and the absorbance at 540 nm as the ordinate.

0.1 g of glucose dried to a constant weight was accurately weighed into a 100 mL volumetric flask, and diluted with distilled water to 100 mL to obtain a 1 mg/mL glucose standard solution. The solution was added as shown in Table 5 and mixed evenly, boiled in a water bath for 10 min, 20 mL of distilled water was added, and a wavelength at 540 nm was measured by an ultraviolet spectrophotometer.

TABLE 5

| | Tube No. | | | | | | | | |
|---|---|---|---|---|---|---|---|---|---|
| Reagent | 1 | 2 | 3 | 4 | 5 | 6 | 7 | 8 | 9 |
| Glucose standard solution (mL) | 0 | 0.2 | 0.4 | 0.6 | 0.8 | 1.0 | 1.2 | 1.4 | 1.6 |
| Distilled water (mL) | 2.0 | 1.8 | 1.6 | 1.4 | 1.2 | 1.0 | 0.8 | 0.6 | 0.4 |
| DNS solution (mL) | 3.0 | 3.0 | 3.0 | 3.0 | 3.0 | 3.0 | 3.0 | 3.0 | 3.0 |
| Glucose content (mg) | 0 | 0.2 | 0.4 | 0.6 | 0.8 | 1.0 | 1.2 | 1.4 | 1.6 |

Figure 2:
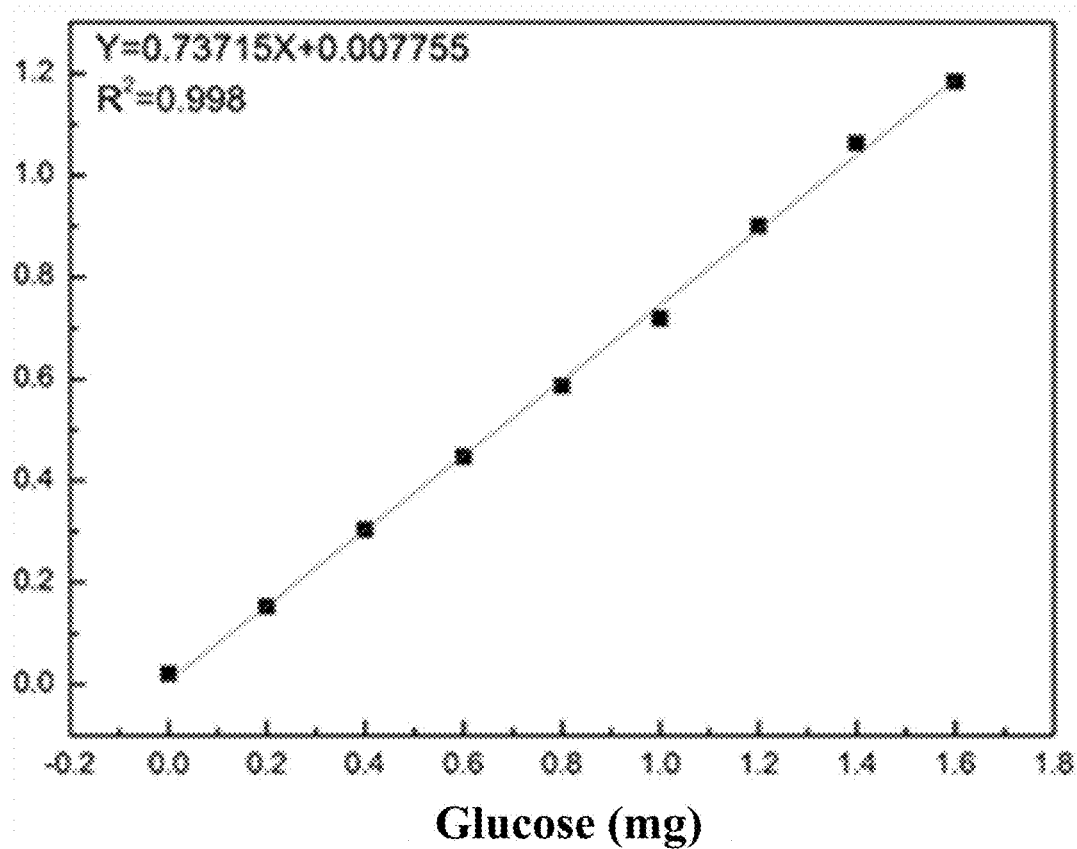
FIG. 2 shows a standard curve of glucose.

FIG. 2 shows a standard curve of glucose. The results show that an equation of the glucose standard curve is: Y=0.73715X+0.007755, $R^2$=0.998. This indicates that the standard curve meets a standard required by the correlation coefficient.

3. Plotting of a p-nitrophenol (pNP) Standard Curve

The exoglucanase and the β-glucosidase can separately react with the substrate to liberate p-nitrophenol, and the p-nitrophenol has an absorbance at 405 nm; and a concentration of the p-nitrophenol is proportional to the absorbance at 405 nm. Therefore, a standard curve was plotted with the concentration of p-nitrophenol as the abscissa and the absorbance at 405 nm as the ordinate. 0.01 g of p-nitrophenol was diluted in a 10 mL volumetric flask to obtain a 1 mg/mL standard solution of p-nitrophenol; the solution was added as shown in Table 6 and mixed uniformly, subjected to boiling water bath for 10 min, and a wavelength at 405 nm was measured using an ultraviolet spectrophotometer.

TABLE 6

| Reagent | No. | | | | | | |
| --- | --- | --- | --- | --- | --- | --- | --- |
| | 1 | 2 | 3 | 4 | 5 | 6 | 7 |
| pNP standard solution (μL) | 0 | 25 | 50 | 75 | 100 | 125 | 150 |
| 10% Na$_2$CO$_3$ solution (μL) | 300 | 300 | 300 | 300 | 300 | 300 | 300 |
| Distilled water (μL) | 150 | 125 | 100 | 75 | 50 | 25 | 0 |
| pNP content (μg) | 0 | 2.5 | 5 | 7.5 | 10 | 12.5 | 15 |

Figure 3:
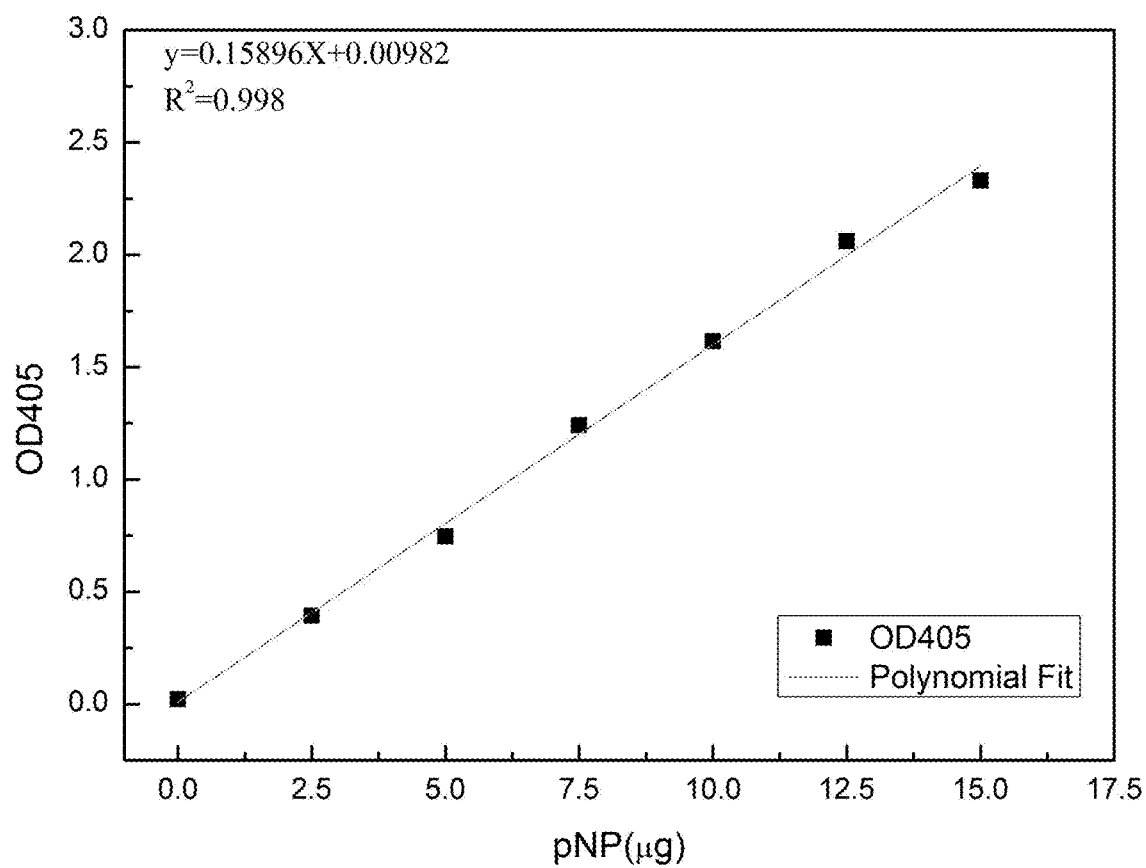
FIG. 3 shows a standard curve of p-nitrophenol.

FIG. 3 shows a standard curve of p-nitrophenol. The results show that an equation of the p-nitrophenol standard curve is: $Y=0.15896X+0.00982$, $R^2=0.998$. This indicates that the standard curve meets a standard required by the correlation coefficient.

4. Determination of the Exoglucanase Activity of a Crude Enzyme Solution 6 2 mL centrifuge tubes were divided into two groups, with 3 in each group, namely an experimental group and a blank control group.

In the blank control group, 500 μL of a crude enzyme solution, 50 μL of a substrate (1 mg/mL pNPC+1 mg/mL gluconolactone) and 150 μL of a 10% Na$_2$CO$_3$ solution were added in sequence, and after 10 min of boiling water bath, centrifugation was conducted at 10,000 rpm for 5 min in a high-speed refrigerated centrifuge to thoroughly mix the liquid in the tube, and a wavelength at 405 nm was measured using an ultraviolet spectrophotometer.

In the experimental group, 500 μL of the crude enzyme solution and 50 μL of the substrate (1 mg/mL pNPC+1 mg/mL gluconolactone) were added; the centrifuge tube was incubated in a 50° C. water bath for 30 min, 150 μL of the 10% Na$_2$CO$_3$ solution was immediately added and treated in a boiling water bath for 10 min; centrifugation was conducted at 10,000 rpm for 5 min in a high-speed refrigerated centrifuge to fully mix the liquid in the tube, and a wavelength at 405 nm was measured using an ultraviolet spectrophotometer; and according to the pNP standard curve, a content $M_{sample}$ of the p-nitrophenol in the test sample was obtained, and the exoglucanase activity of the crude enzyme solution was obtained.

Definition of the exoglucanase activity (U): 1 mL of the crude enzyme solution catalyzes the substrate (pNPC and gluconolactone) to produce 1 μg of the p-nitrophenol within 1 min at 50° C., as a unit of enzyme activity.

5. Determination of the Endoglucanase Activity of a Crude Enzyme Solution 6 tubes were divided into two groups, with 3 in each group, namely an experimental group and a blank control group.

In the blank control group, 500 μL of a crude enzyme solution, 1.5 mL of a substrate (1% CMC-Na solution) and 3 mL of a DNS solution were added in sequence, and distilled water was added to make the volume to 25 mL after boiling water bath for 10 min; the liquid in the tube was thoroughly mixed by shaking, and a wavelength at 540 nm was measured using an ultraviolet spectrophotometer. In the experimental group, 500 μL of the crude enzyme solution and 1.5 mL of the substrate (1% CMC-Na solution) were added, and the test tube was incubated in a 50° C. water bath for 30 min; 3 mL of the DNS solution was immediately added and treated in a boiling water bath for 10 min, and diluted by distilled water to 25 mL; the test tube was shaken to fully mix the liquid in the tube, and a wavelength at 540 nm was measured using an ultraviolet spectrophotometer; and according to the glucose standard curve, a content $M_{sample}$ of glucose in the sample was obtained, and the endoglucanase activity of the crude enzyme solution was obtained.

Definition of the endoglucanase activity (U): 1 mL of the crude enzyme solution catalyzes the substrate (CMC-Na) to produce 1 μg of the glucose within 1 min at 50° C., as a unit of enzyme activity.

6. Determination of the β-Glucosidase Activity of a Crude Enzyme Solution 6 2 mL centrifuge tubes were divided into two groups, with 3 in each group, namely an experimental group and a blank control group.

In the blank control group, 200 μL of a crude enzyme solution, 100 μL of a substrate (1 mg/mL pNPG) and 300 μL of a 10% Na$_2$CO$_3$ solution were added in sequence, and centrifuged at 10,000 rpm for 5 min in a high-speed refrigerated centrifuge after 10 min of boiling water bath such that the liquid in the tube was thoroughly mixed, and a wavelength at 405 nm was measured using an ultraviolet spectrophotometer.

In the experimental group, 200 μL of the crude enzyme solution and 50 μL of the substrate (1 mg/mL pNPG) were added; the centrifuge tube was incubated in a 50° C. water bath for 30 min, 300μL of the 10% Na$_2$CO$_3$ solution was immediately added and treated in a boiling water bath for 10 min; centrifugation was conducted at 10,000 rpm for 5 min in a high-speed refrigerated centrifuge to fully mix the liquid in the tube, and a wavelength at 405 nm was measured using an ultraviolet spectrophotometer; and according to the pNP standard curve, a content $M_{sample}$ of the p-nitrophenol in the test sample was obtained, and the β-glucosidase activity of the crude enzyme solution was obtained. Definition of the β-glucosidase activity (U): 1 mL of the crude enzyme solution catalyzes the substrate (pNPG) to produce 1 μg of the p-nitrophenol within 1 min at 50° C., as a unit of enzyme activity.

Figure 4:
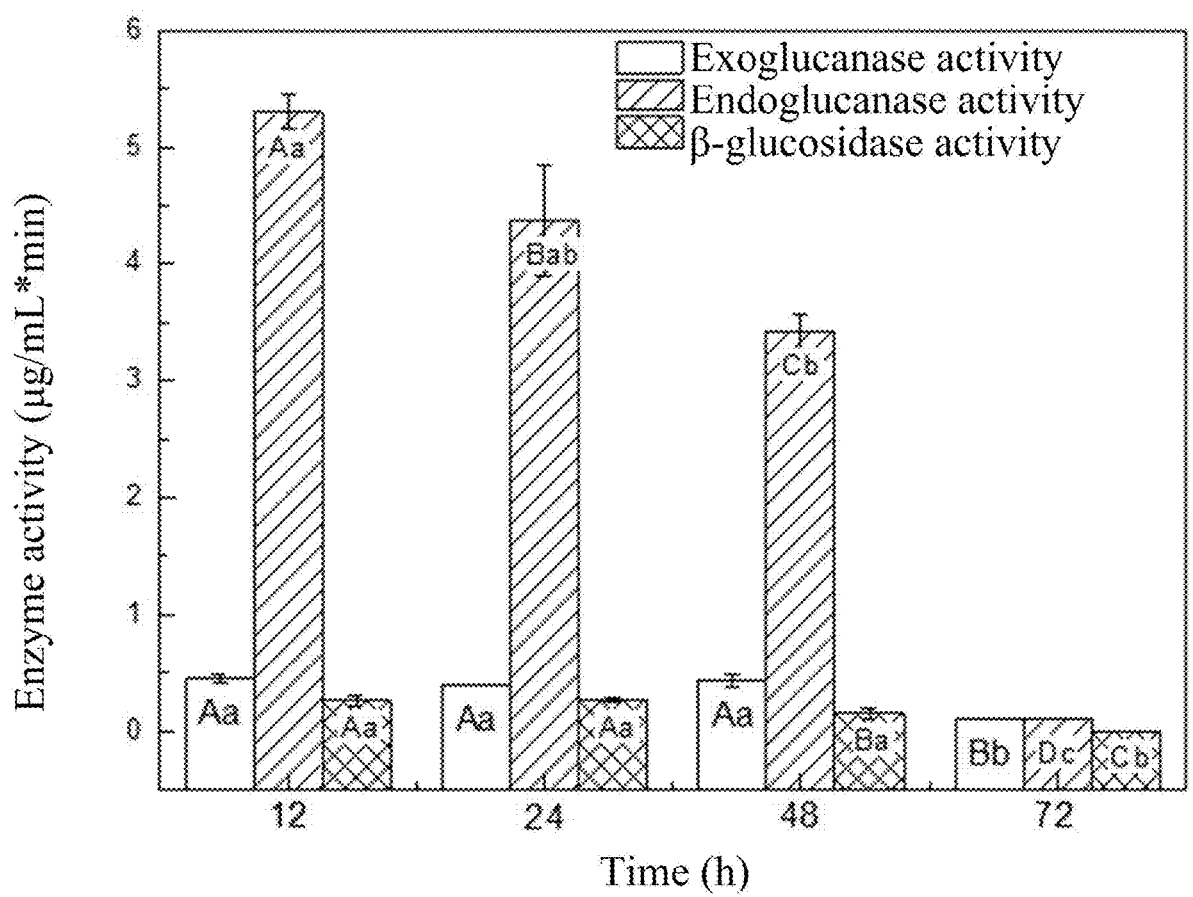
FIG. 4 shows a detection result of activities of exoglucanase, endoglucanase, and β-glucosidase in a crude enzyme solution.

The test results are shown in FIG. 4 (where lowercase letters indicate significant differences, uppercase letters indicate extremely significant differences, different lowercase letters indicate significant differences ($p<0.05$), and different capital letters indicate extremely significant differences ($p<0.01$)). The results show that the crude enzyme solution prepared in the first step has activities of the exoglucanase, the endoglucanase, and the β-glucosidase, that is, the crude enzyme solution prepared in the first step has a cellulase activity.

It can be seen that *Klebsiella pneumoniae* Y7-3 has the ability to secrete cellulase.

What is claimed is:

1. A microbial inoculant comprising a bacterial seed liquid and a carrier,
wherein the bacterial seed liquid comprises *Klebsiella pneumoniae* strain Y7-3 with deposit number CCTCC NO: M2019851 in LB liquid medium, wherein the carrier is polyvinyl alcohol and/or polyglycol.

2. The microbial inoculant according to claim 1, wherein the microbial inoculant is in a dosage form selected from the group consisting of a liquid, an emulsion, a suspension, a powder, a granule, a wettable powder, and a water-dispersible granule.

3. A method for preparing the bacterial seed liquid according to claim 1, comprising culturing the *Klebsiella pneumoniae* strain Y7-3 in the LB liquid medium for 22-26 at 35-39° C. while shaking at 160-200 rpm.

4. The microbial inoculant according to claim 1, the microbial inoculant further comprises a surfactant, an adhesive, a stabilizer, and a pH adjuster.

5. The method according to claim 3, wherein the LB liquid medium is prepared by adding distilled water to 10 g of peptone, 5 g of a yeast extract powder and 10 g of sodium chloride, adjusting a pH value to 7.0, adjusting a volume to 1 L, sterilizing at 121° C. for 20 min, and cooling for use.

6. A method for degrading cellulose and hemicellulose, comprising treating cellulose and hemicellulose with the microbial inoculant according to claim 1.

7. A method for degrading a carbon source, comprising treating the carbon source with the microbial inoculant according to claim 1.

8. A method for producing at least one of acetic acid, ethanol, 1,3-propanediol, lactic acid, and hydrogen, comprising degrading a carbon source or a nitrogen source with the microbial inoculant according to claim 1.

9. A method for preparing exoglucanase, endoglucanase, and/or β-glucosidase, comprising separating exoglucanase, endoglucanase, and/or β-glucosidase from a supernatant of the bacterial seed liquid of claim 1.

10. The method according to claim 7, wherein the carbon source is an organic carbon source and/or an inorganic carbon source.

11. The method according to claim 8, wherein the carbon source is an organic carbon source and/or an inorganic carbon source; and the nitrogen source is an organic nitrogen source and/or an inorganic nitrogen source.

* * * * *